March 24, 1925.                                        1,530,827
R. W. GUNN ET AL
BLIND CAGE COMBINATION FOR PUMP VALVES
Filed Dec. 16, 1920
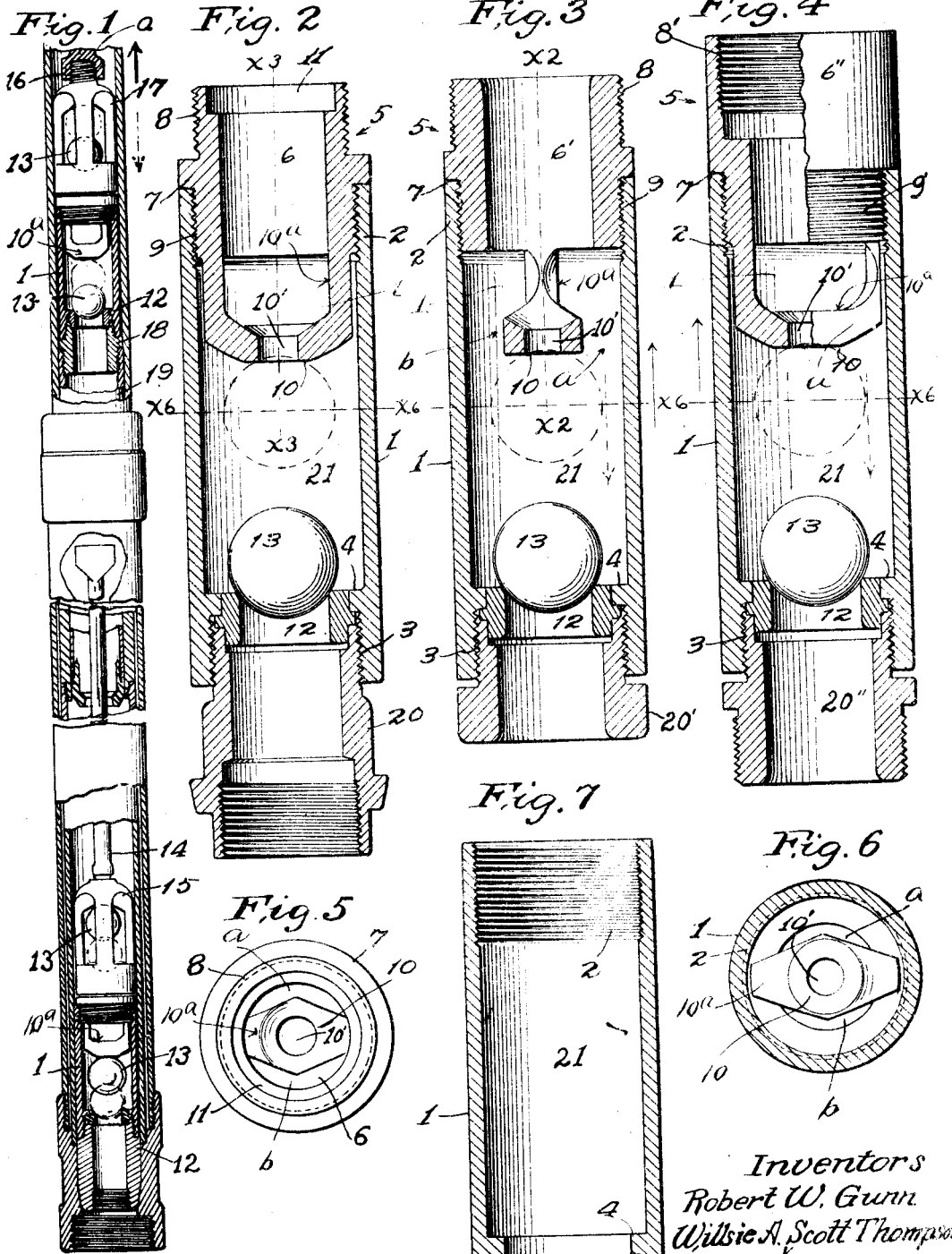
Witness
C. C. Holly
Inventors
Robert W. Gunn
Willsie A. Scott Thompson
James R. Townsend
his atty Patented Mar. 24, 1925.

1,530,827

UNITED STATES PATENT OFFICE.

ROBERT W. GUNN AND WILLSIE A. SCOTT THOMPSON, OF LOS ANGELES, CALIFORNIA.

BLIND-CAGE COMBINATION FOR PUMP VALVES.

Application filed December 16, 1920. Serial No. 431,145.

*To all whom it may concern:*

Be it known that we, ROBERT WALTER GUNN and WILLSIE A. SCOTT THOMPSON, citizens of the United States, residing at Los Angeles, in the county of Los Angeles and State of California, have invented a new and useful Blind-Cage Combination for Pump Valves, of which the following is a specification.

In oil-well field practice, various arrangements of valves are required in the same pump under various conditions and an object of this invention is to provide an equipment for pump construction and repair which will be applicable to all the situations which may arise calling for change or repair of the pump valves. That is to say, we have made provision whereby the valve equipment for pumps will enable the man at the shop or in the field to provide a standing valve, a working valve at one or both ends of the pump plunger and either a single or a double valve at any position required.

This novel equipment comprises a cylindrical blind cage sleeve having an intermediate internal annular collar and a cylindrical counter-bore at each end; one of said bores being larger than the other and extending from one end nearly to the other end of said sleeve; and said counter-bore being correspondingly threaded for a short distance to receive a standard bushing; said counter-bores terminating at the annular collar inside said sleeve near one end of the sleeve, and adapted to seat the standard valve seat and being internally threaded to the end of the sleeve; and a complement of bushings all adapted to screw into the open end of the cylindrical counter-bore, and provided with a bridge extending from the near end of the bushing and adapted to extend across said counter-bore to serve as a bumper for a valve inside said sleeve; the bushings being respectively adapted for connecting the sleeves with appropriate fittings for standing valve and working valve in various situations according to the requirements for operation.

An object of this invention is to provide for pump construction a practical blind valve cage the parts of which may be used in different relations with standard parts of pumps as now constructed, so that numerous requirements may be met by the use of said standard parts in connection with said blind cage sleeve. The invention comprises the cage and its parts.

In the present state of the art it is necessary to provide a different form of ball valve cage for the valve used in different relations, such, for instance, as the standing valve, the working valve and the plunger valve. In consequence of this condition the man in the field is not able to repair or replace a damaged or worn standing valve with the parts pertaining to a working valve or a plunger valve, and vice versa.

Furthermore the construction of the sleeves of valve cages heretofore has been of such a nature that the cost of producing the same is comparatively great and an object of this invention is to minimize the cost of producing the valve cage sleeve and also the cost of producing the different types of valves respectively.

Simplicity and convenience of manufacture and of assembling the parts are further objects.

An object is to provide an insert embodying my bumper that is adapted for valves of different types.

The invention is broadly new, pioneer and primary in that we provide a two-piece blind cage, the parts of which are variously adjustable, and are applicable in combination with standard valve parts now in common use to construct the various kinds of valves required in present pump practice.

An object is to provide valve cages devoid of cross pins which in former constructions are likely to score the working barrel.

Other features of invention together with other objects and advantages may appear from the accompanying drawing, the subjoined detailed description and the appended claims.

The accompanying drawing illustrates the invention.

Figure 1 is a fragmental elevation partly in section, of a pump provided with a double ball standing valve and a double ball working valve, each of the parts of which are constructed of standard pump valve parts together with the parts which go to make up our blind cage. The valve balls are shown in solid lines on the up-stroke and in dotted lines on the down-stroke of the plunger.

Fig. 2 is an enlarged detail, in axial section, of the blind cage arranged as a standing valve. The insert at the top of the view is sectioned on line indicated at $x^2$, Fig. 3. The valve ball is shown in solid lines as at the down-stroke and in dotted lines as at the up-stroke, of the plunger.

Fig. 3 is a view analogous to Fig. 2 showing the parts arranged as a plunger valve. The insert at the top of the view is sectioned on line indicated at $x^3$, Fig. 2, and the valve ball is shown in solid lines as at the up-stroke, and in dotted lines as at the down-stroke, of the plunger.

Fig. 4 is a view analogous to Figs. 2 and 3 showing the invention arranged as a plunger valve for pumping through a hollow rod; the insert at the top of the view being provided with a tubular box instead of the tubular pin shown in Figs. 2 and 3. The solid and dotted positions of the valve ball are analogous to those in Fig. 3 and the direction of the plunger for the up and down strokes of the plunger in Figs. 1, 3 and 4 are indicated by arrows in solid and dotted lines respectively.

Fig. 5 is a plan of one end of the insert, detached.

Fig. 6 is a view analogous to Fig. 5 showing the other end of the insert.

Fig. 7 is an axial section of the cage body or sleeve, detached.

The cage body or sleeve 1 is in the form of a hollow cylinder having internal threaded end portions 2, 3 and an internal annular valve seat clamping shoulder 4.

The insert 5 is in form, a bushing, and comprises a tubular member as at 6, 6' and 6'' having an annular external shoulder 7, threaded sections 8, 8', 9, on opposite sides of the shoulder, and a bridge 10ª at one end, which when the insert is in place, is the bottom end of the insert. Said bridge being provided with an enlargement forming a centrally disposed and centrally perforated ball bumper or intercepter, and being thin and narrow on opposite edges of said bumper, to allow free movement of the liquid past the bridge; and vice versa, free movement of the bridge past the liquid, which, when the insert is in place, is the bottom end.

The insert may be variously constructed at the end opposite to the bridge 10ª; and in Fig. 2 a valve-seat socket 11 is shown, while in Figs. 3 and 4 other constructions are indicated for the upper end of the inserts for plunger and hollow rod valves, respectively.

In the several views, 12 indicates a standard valve seat in the sleeve and below the bridge and 13 is a standard valve ball applicable to any of the forms shown, and adapted and arranged to close the orifice of the valve seat, and to operate between the valve seat and the bridge. In Fig. 1, 14 indicates the usual Garbutt attachment secured to the usual ball cage 15 of the standing valve. 16 indicates a pin in which the working valve cage 17 terminates at its upper end for connection to the sucker rod a.

18 indicates the customary coupling between the double ball working valve cage 1 and the plunger valve 19.

The annular shoulder 4 forms a stop for the valve seat 12 which is secured in place against said stop, in the usual manner by a pump member which may be of various forms as at 20, 20' and 20''.

In practice the blind cage for the different situations is formed simply by appropriately applying the required insert 6, 6' or 6'', to the body 1.

The valve bumper or intercepter is shown as an enlarged central portion of said bridge 10ª and is provided with an orifice 10' in the lower end of which the valve ball 13 will come to rest when unseated and lifted thereto by liquid from the seat 12 by the action of the pump. A passage as at $a$, $b$, leads from the cage body or sleeve 1 around said bridge and bumper into the bore of the insert 6, 6' and 6'', as the case may be so that when the ball valve 13 is lifted to the circular orifice 10', the flow of oil is practically not intercepted. The bumper 10 is of less diameter than the valve ball. The liquid during the upstroke of the piston will be deflected by the valve-ball of the standing valve and will flow past such bumper unimpeded, the ball and the narrow bridge being practically the only obstructions to free flow of the liquid.

The sleeve 1 is easily constructed by simply drilling out a definite bore throughout a required length in a tubular casting, inserting the drilling tool at the upper end of the sleeve to form the bore as shown in the drawings; said bore extending to the collar 4 near the lower end of the tube, and then drilling a bore to said collar 4 from the other end of the sleeve: the bores formed by the drilling operation being of appropriate size respectively adapted to the use of which the particular sleeve is to be put. Then the ends of the sleeve are threaded to the diameter required for such particular purpose.

In practical operation, with the combination assembled as shown in Fig. 2 and at the bottom of Fig. 1, the down-stroke of the plunger will seat the valve ball 13 on the valve seat 12; and on the up-stroke the valve ball 13 will be carried by the liquid that is pumped up against the valve bumper 10.

The orifice at the shoulder 4 is of sufficient diameter to allow the valve 13 to be inserted into the intermediate bore 21 in the usual manner; and in the drawings the lower threaded portion or section 3 of the sleeve is of less diameter than the upper threaded portion or section 2 of said sleeve, and the threaded portions 8 and 9 of the insert may likewise be of different diameters; the upper threaded portion 8 being adapted for connection to standard parts as the standard sucker rod cage 17 or the standard Garbutt attachment cage 15.

When the standing valve balls 13 are unseated by the up-stroke of the plunger in Fig. 1 the bumpers 10 intercept the valve balls and prevent them from being carried up too far by the liquid; and in such upstroke the lifting valve ball will be seated in the valve ball seat 12. On the down stroke of the plunger, the standing valve ball will be seated and the lifting valve ball will rise to the bumper and be centered therein by the hole 10' in Fig. 3.

The bore of the sleeve above the valve seat is of such diameter greater than that of the valve ball, as to accommodate the valve ball and allow the free passage of liquid during the pumping operation.

In practical operation in the field, valve problems arise which have to be settled in the field.

that may be determined by the superintendof that they would want a ball valve at the bottom of the plunger of the pump, in other words that the plunger should have a valve in the bottom of it. In most cases the valve for the plunger is in the top of the plunger, such valve is called a working valve.

In other cases they might want two valves on the standing valve and a valve on the top of the plunger and one on the bottom of the plunger. The need for these valves is by reason of the presence of gas in the oil at the bottom of the well.

When a plunger of an ordinary or standard pump comes down the valves being spaced one at the bottom of the working barrel, and the other on top of the plunger, there is quite a space between the two, and the gas will compress on the downward stroke of the plunger; and then on the up stroke the gas expands and there is no fluid sucked in, but there is just an expansion and contraction of the gas; and the pump simply works to compress and allow the expansion of the gas without producing any oil. In those cases when a valve in the bottom of the plunger is wanted, the idea is to bring the valves close together so that the displacing space which the oil has to pass will be less.

The standard plungers of such pumps are usually from 50 to 72 inches long so that the placing of the valve at the bottom instead of at the top of the plunger makes a great difference.

For certain reasons the standard equipment is provided with one valve in the top of the plunger and an object of this invention is to make it practical in the field to take the ordinary standard plunger and change the valve from the top of it to the bottom of it.

We claim:

1. In a pump valve, the combination with a sleeve and a valve seat below the top of the sleeve; of an insert screwed into the top of the sleeve and provided above the valve seat with a bridge which has an enlarged central portion provided with a circular orifice to intercept a valve-ball in the sleeve at operation of the pump.

2. In a pump valve, a sleeve and a valve seat in the sleeve, an insert threaded to the sleeve above the valve seat and provided with a bridge having an enlarged central portion, and being thin and narrow on opposite edges of said central portion, said central portion being of a smaller diameter than that of the valve-ball adapted to fit said valve seat.

3. An insert for pump valves having a bridge depending therefrom and provided with an enlarged central portion, there being a circular orifice in said central portion.

4. In a pump valve, a sleeve and a valve seat in the sleeve, an insert threaded to the sleeve above the valve seat, a bridge depending from said insert and provided with a central portion having a circular orifice, a ball adapted to seat in said valve seat on downward action of the pump and in said central orifice on upward action of the pump, the diameter of said enlarged central portion being less than that of said ball, and being countersunk on the side opposite that which intercepts the ball valve and around the circular orifice, to deflect liquid into the circular orifice on the downflow of the liquid.

5. In a pump valve, the combination of a sleeve and a valve seat in the sleeve; a valve ball adapted to seat on said valve seat; an insert secured to the sleeve above the valve seat and provided with a bridge having a central portion to intercept said valve ball at operation of the pump; and a shoulder on said insert above said sleeve; said insert being threaded above said shoulder and adapted to screw onto a pump attachment substantially as described.

6. An insert for pump valves having a threaded portion adapted to be threaded to a sleeve and having a bridge depending therefrom and provided with an enlarged central portion.

In testimony whereof, we have hereunto set our hands at Los Angeles, California, this 7th day of December, 1920.

ROBERT W. GUNN.
WILLSIE A. SCOTT THOMPSON.

Witness:
JAMES R. TOWNSEND.